(12) United States Patent
Nau et al.

(10) Patent No.: US 6,991,183 B2
(45) Date of Patent: Jan. 31, 2006

(54) ATOMIZING NOZZLE

(75) Inventors: Michael Nau, Dornhan/Aischfeld (DE); Manfred Ruoff, Moeglingen (DE); Marc Bareis, Markgroeningen (DE); Frank Ilgner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 10/181,668

(22) PCT Filed: Jan. 17, 2001

(86) PCT No.: PCT/DE01/00171

§ 371 (c)(1),
(2), (4) Date: Dec. 16, 2002

(87) PCT Pub. No.: WO01/53676

PCT Pub. Date: Jul. 26, 2001

(65) Prior Publication Data

US 2003/0132315 A1    Jul. 17, 2003

(30) Foreign Application Priority Data

Jan. 19, 2000  (DE) ................................ 100 02 005

(51) Int. Cl.
B05B 1/28    (2006.01)
B05B 7/10    (2006.01)

(52) U.S. Cl. .................... 239/290; 239/296; 239/297; 239/298; 239/399; 239/401

(58) Field of Classification Search ................ 239/290, 239/296, 297, 298, 398, 400, 401, 399, 406, 239/413, 419.3, 422, 429, 533.2
See application file for complete search history.

(56) References Cited

U.S. PATENT DOCUMENTS

| | | | |
|---|---|---|---|
| 3,971,847 A | | 7/1976 | Houseman |
| 5,066,421 A | * | 11/1991 | Giacobbe .................... 252/373 |
| 5,823,429 A | * | 10/1998 | Beck et al. .................... 239/5 |
| 5,942,346 A | * | 8/1999 | Ahmed et al. ................ 429/20 |
| 6,021,635 A | * | 2/2000 | Gaag et al. ................... 60/775 |
| 6,244,367 B1 | * | 6/2001 | Ahmed et al. ............. 180/65.1 |

FOREIGN PATENT DOCUMENTS

| | | |
|---|---|---|
| DE | 27 57 522 | 3/1979 |
| EP | 0 575 254 | 12/1993 |
| FR | 1 020 942 | 2/1953 |
| GB | 994 109 | 6/1965 |

\* cited by examiner

Primary Examiner—Davis Hwu
(74) Attorney, Agent, or Firm—Kenyon & Kenyon

(57) ABSTRACT

Atomizing nozzle for introducing a gas/liquid mixture into a chemical reformer to produce hydrogen, having at least one gas supply line (21) for a gas stream (20), at least one liquid supply line (25, 27) and at least one outlet (19) for the atomized gas/liquid mixture as well as a first chamber (24) into which the liquid supply line (25, 27) empties, with the chamber (24) having a chamber wall (16) that forms a lip (18) at the outlet end, on both sides of which a separate gas flow (20, 22) is supplied.

10 Claims, 1 Drawing Sheet

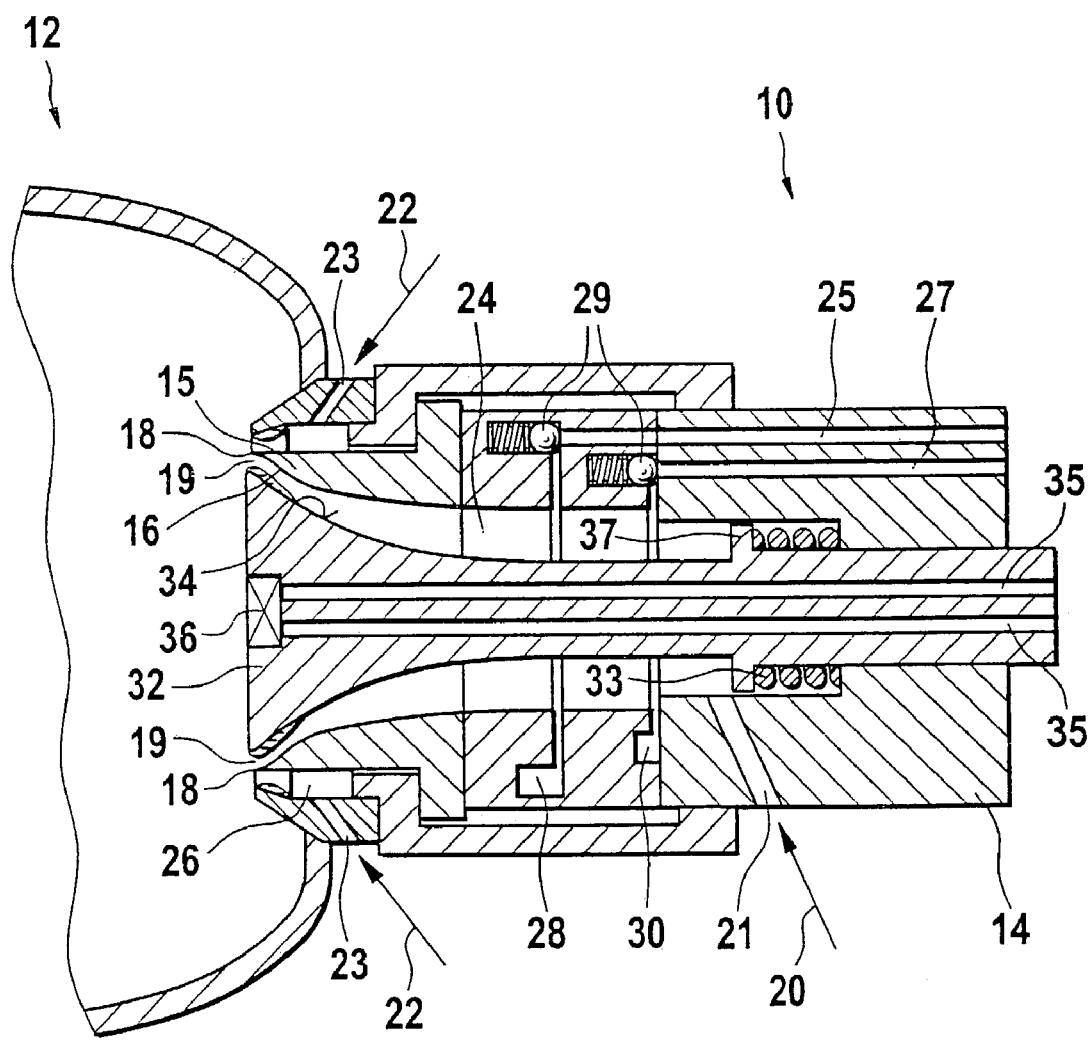

ATOMIZING NOZZLE

The present invention relates to an atomizing nozzle, in particular for introducing a gas/liquid mixture into a chemical reformer according to the definition of the species in claim 1.

BACKGROUND INFORMATION

Among the alternative drive concepts for motor vehicles, fuel cell-supported systems, in particular, are currently generating a great deal of attention. These systems typically include PEM (polymer electrolyte membrane) fuel cells that operate with hydrogen and air as the energy carriers.

Because hydrogen refueling and storage in the motor vehicle remains a problem, hydrogen is produced directly on-board as needed in an upstream reformer stage from easy-to-handle fuels such as methanol, methane, diesel oil or gasoline and consumed immediately. The reformers employed for this purpose are chemical reactors that are used to partially oxidize the fuels by adding air and moisture, for example at a temperature of 800° C., in catalytic converters, producing hydrogen and other secondary products, such as CO and $CO_2$.

Supplying the reformer with the educts needed for the reaction is thus a very important step. All educts, such as air, water and fuel, are typically supplied to the reformer in a gaseous state. This requires an evaporation tube that is able to provide the proper amounts of gaseous fuel and steam.

However, problems arise during the cold start phase, since the liquid educts cannot be vaporized by the reformer waste heat, but only by an electrically heated evaporator. In addition, conventional evaporators are unable to instantaneously generate the proper quantities of gaseous reactants when load change requirements vary abruptly.

Alternative concepts have thus been developed to inject fuels and water directly into the reformer in liquid form. However, to carry out the reaction in the reformer as efficiently as possible, the liquid educts must be introduced into the reformer in a finely dispersed form. A reactor for producing hydrogen that has a nozzle for injecting liquid hydrocarbons into an air stream is known from U.S. Pat. No. 3,971,847. The resulting mist is swirled on baffle plates before entering the actual reaction zone. However, the water needed for the reaction is evaporated separately in an evaporation tube.

The object of the present invention is to provide an atomizing nozzle for the simultaneous atomization of water and liquid fuels, with the atomizing nozzle having a very high degree of educt atomization and mixing and, in addition, being designed for instantaneous metering of liquid educts.

ADVANTAGES OF THE INVENTION

The atomizing nozzle according to the present invention having the characterizing features of Claim 1 has the advantage that a gas/liquid mixture is generated which is distinguished by a high degree of atomization and thorough reactant mixing. It also gives the system a good cold start performance and provides adequate response to dynamic load changes.

The high degree of atomization is achieved by conducting the liquid to be atomized into a chamber through which a gas stream flows and by having the liquid film forming on the chamber wall surrounded and entrained by the gas stream at a lip or separating edge. A particularly advantageous feature is that a gas flow passes around both sides of the lip at high speed, which further enhances the atomizing effect and produces very large spray angles. This is necessary if the reformer is to have a compact design. Because the atomizing nozzle includes multiple liquid and gas supply lines, the necessary mixture quantity and composition may be provided in each case, depending on the reformer operating state.

Because the liquid atomization process is exclusively gas-supported, only low liquid pressures are necessary and there is no need to install expensive high-pressure pumps.

Advantageous embodiments and refinements of the present invention are made possible by the features described in the subordinate claims. Thus, the atomizing nozzle is advantageously provided with an annular lip and an outlet and includes an axially moving plunger which maintains a uniformly high gas flow rate despite varying gas volume flows at the lip. The plunger has at least one further liquid supply line that ensures the pressure-supported metering of liquid educts directly into the reformer. This is useful, especially when the system has low load requirements, because the low gas volume flows in this case do not enable adequate gas-supported atomization of the liquid reactants. Direct pressure-supported injection of the liquid educts is also advantageous when the load requirements rise abruptly, since the additional quantity of liquid educts needed may be provided without delay.

In a particularly advantageous embodiment, two separate gas supply lines are provided, each of which empties into a separate chamber within the atomizing nozzle. Both chambers are arranged so that they share a common wall whose outlet end forms the lip. This makes it possible to expose the lip to two gas flows of different speeds and compositions.

According to an advantageous embodiment, gas guiding devices are provided in at least one of the chambers for the purpose of swirling the gas flow. This increases the mixing degree of the gas/fluid mixture.

It is further advantageous to design the chamber and plunger surfaces so that the chamber cross-section between the chamber wall and plunger has a minimum in the lip area, and the resulting high gas flow rates produce effective atomization of the liquid.

DRAWINGS

An exemplary embodiment of the present invention is illustrated in the drawing and explained in greater detail in the following description.

The FIGURE shows a cross-section of the atomizing nozzle according to the present invention.

EXEMPLARY EMBODIMENT

FIG. 1 shows a cross section of atomizing nozzle 10 according to the present invention, which is provided in a reactor wall of a partially illustrated chemical reformer 12.

Atomizing nozzle 10 includes a housing 14 which has an outlet 19 on the reactor side. Outlet 19 is designed, for example, with an annular shape. A first chamber 24, into which at least one first gas supply line 21 which supplies a first gas flow 20 to chamber 24 empties, is located in housing 14. A first liquid supply line 25 and a second liquid supply line 27, which supply liquid educts to chamber 24, are provided downstream and empty into first chamber 24. To prevent subsequent liquid leakage, liquid supply lines 25, 27 are equipped with spring-loaded non-return valves 29.

Annular gaps 28, 30, which enable the outflowing liquid to wet entire wall 16 of chamber 24, are provided at the outlets of liquid supply lines 25, 27. Wall 16 of chamber 24, which is covered by the liquid film, is delimited on the outlet side by a lip 18 at which the liquid film is entrained and atomized. Chamber 24 may also have a means (not illustrated) for swirling the gas flow, such as a gas guiding device.

A plunger 32, whose surface 34 matches the geometry of chamber wall 16, is also provided inside chamber 24, with the distance between plunger surface 34 and chamber wall 16 having a minimum in the area of lip 18. This produces high flow velocities in the area of lip 18, thus effectively atomizing the liquid. It is especially advantageous for the surfaces of plunger 34 and chamber 16 to approach each other in the area of lip 18 in a manner that forms a venturi tube-like passage, since this minimizes any throttle losses that occur and optimizes the mixing of gas and atomized liquid.

Plunger 32 includes in the axial direction at least one, preferably two, additional liquid supply lines 35 that ensure direct pressure-supported metering of liquid educts into the reformer. For this purpose, an atomizer 36 that is designed, for example, as a swirl nozzle or a perforated jet nozzle having one or more holes is provided at the outlet end of further liquid supply line 35. The pressure supported metering of liquid educts is especially important in the case of low system load requirements, when adequate atomization is not possible due to the low volume of gas to be supplied. Direct pressure-supported injection of the liquid educts is also advantageous when the system load requirements increase abruptly, since the additional quantity of liquid educts needed may be provided without delay.

Plunger 32 is attached to housing 14 by extension or compression springs 33 so that the spring resistance of springs 33 compensates for the forces applied by the gas flow onto plunger 32 in the axial direction and, due to the small cross-section of chamber 24, produces a high velocity of gas flow 20. This reduces the gap width between chamber wall 16 and the surface of plunger 34, corresponding to a weak gas flow 20, when the load requirements are low and increases the gap width when the load requirements are high. This makes it possible to adjust the gap width to the throughput. FIG. 1 shows an arrangement in which plunger 32 is attached to a shoulder 37 by an extension spring 33.

In addition to first chamber 24, a second chamber 26 into which empties at least one second gas supply line 23 supplying a second gas flow 22 to chamber 26 is also provided in housing 14. Chamber 26 and chamber 24 share a common wall 15 whose thickness diminishes on the outlet side and forms lip 18. Chamber 26 is thus preferably designed so that its chamber wall forms a venturi tube-like passage for gas flow 22 in the area of the lip. Chamber 26 is arranged around chamber 24, for example in the form of a cylindrical surface.

All components of atomizing nozzle 10 are made, for example, of stainless steel, although other heat- and corrosion-resistant materials may also be used.

A number of different educt mixtures may be used to produce hydrogen, depending on the requirements. Thus, hydrogen is obtainable by partially oxidizing fuels and adding either steam, air or a mixture of both. Conversion takes place in a catalytic converter that is heatable by the usual methods, using gasoline, diesel, methane, or methanol as fuels. Methanol/water mixtures or fuel/water emulsions are also suitable.

The reformer and the overall system have different operating states, depending on the fuel cell load requirements. The atomizing nozzle according to the present invention is also always able to provide the system with the necessary educts in the required quantities and composition even when the operating states vary.

Under steady-state operating conditions, air and/or steam must be supplied to the reformer. This may be done either by supplying steam to the reformer, for example via gas supply line 23, and air via gas supply line 21, or by supplying both gas supply lines 21, 23 with an air/steam mixture. It is thus possible to supply air and steam to the reformer either in premixed form or as largely separate gas flows. The liquid fuel is preferably supplied via first or second liquid supply line 25, 27 and enters reformer 12 in a finely dispersed form. A possible alternative is to inject the fuel directly into the reformer via further liquid supply line 35. Alternatively, water may also be supplied to the system via liquid supply lines 35, 27, 35. This is especially useful in the case of abrupt load changes.

During the system cold start phase, steam is unavailable, and water is supplied to the reformer in liquid form. The high atomization degree of the gas/liquid mixtures produced by the atomizing nozzle according to the present invention significantly accelerates starting. In addition, starting performance may be further improved by a heated catalytic converter in the reformer.

If the atomizing nozzle is coupled with a corresponding metering system for the gaseous and liquid educts, the metering and atomizing functions are advantageously physically separated from each other. This is especially important, since the metering valves require expensive cooling when positioned near the reformer.

The atomizing nozzle according to the present invention is not limited to the exemplary embodiment described above, but instead further embodiments of an atomizing nozzle based on gas flow-supported atomization are conceivable. For example, it is not absolutely necessary to integrate the atomizing nozzle into the reactor wall of reformer 12, but instead it may be positioned in the reformer supply line system.

What is claimed is:

1. An atomizing nozzle for introducing a gas/liquid mixture into a chemical reformer to produce hydrogen, comprising:
   at least one gas supply line for a gas stream;
   at least one first liquid supply line;
   at least one second liquid supply line;
   at least one outlet for the gas/liquid mixture;
   a chamber into which the at least one first liquid supply line and the at least one second liquid supply line empties, the chamber includes a chamber wall that forms a lip at the at least one outlet end on either side of which a gas stream is supplied;
   a first gas supply line that leads to the chamber upstream from the at least one outlet; and
   a second gas supply line that leads to a second chamber, wherein the chamber and the second chamber share a common wall which forms the lip.

2. The atomizing nozzle of claim 1, wherein at least one of the lip and the at least one outlet have an annular shape.

3. The atomizing nozzle of claim 1, wherein liquid in the gas/liquid mixture includes at least one of water and fuel.

4. The atomizing nozzle of claim 1, wherein the gas stream includes at least one of air and steam.

5. An atomizing nozzle for introducing a gas/liquid mixture into a chemical reformer to produce hydrogen, comprising:
- at least one gas supply line for a gas stream;
- at least one first liquid supply line;
- at least one second liquid supply line;
- at least one outlet for the gas/liquid mixture; and
- a chamber into which the at least one first liquid supply line and the at least one second liquid supply line empties, the chamber includes a chamber wall that forms a lip at the at least one outlet end on either side of which a gas stream is supplied;
- wherein the at least one first liquid supply line and the at least one second liquid supply line empty into a first annular gap and a second annular gap within the chamber.

6. An atomizing nozzle for introducing a gas/liquid mixture into a chemical reformer to produce hydrogen, comprising:
- at least one gas supply line for a gas stream;
- at least one first liquid supply line;
- at least one second liquid supply line;
- at least one outlet for the gas/liquid mixture; and
- a chamber into which the at least one first liquid supply line and the at least one second liquid supply line empties, the chamber includes a chamber wall that forms a lip at the at least one outlet end on either side of which a gas stream is supplied;
- wherein at least one spring-loaded non-return valve is included in the first liquid supply line and the second liquid supply line to prevent subsequent fluid leakage.

7. An atomizing nozzle for introducing a gas/liquid mixture into a chemical reformer to produce hydrogen, comprising:
- at least one gas supply line for a gas stream;
- at least one first liquid supply line;
- at least one second liquid supply line;
- at least one outlet for the gas/liquid mixture; and
- a chamber into which the at least one first liquid supply line and the at least one second liquid supply line empties, the chamber includes a chamber wall that forms a lip at the at least one outlet end on either side of which a gas stream is supplied;
- wherein the chamber includes an axially moving plunger having a surface with geometry that at least matches that of the wall of the chamber, and the plunger is attached to a housing by at least one spring.

8. The atomizing nozzle of claim 7, wherein a cross-section of the plunger increases in size at the at least one outlet end so that distance from the surface to the chamber wall has a minimum in an area of the lip.

9. The atomizing nozzle of claim 7, wherein the plunger is formed as a stamp and includes at least a third liquid supply line that includes an additional nozzle on an end face of the plunger for pressure-supported atomization of liquid of the gas/liquid mixture.

10. An atomizing nozzle for introducing a gas/liquid mixture into a chemical reformer to produce hydrogen, comprising:
- at least one gas supply line for a gas stream;
- at least one first liquid supply line;
- at least one second liquid supply line;
- at least one outlet for the gas/liquid mixture; and
- a chamber into which the at least one first liquid supply line and the at least one second liquid supply line empties, the chamber includes a chamber wall that forms a lip at the at least one outlet end on either side of which a gas stream is supplied;
- wherein the chemical reformer includes a reformer for a fuel cell and the atomizing nozzle is configured for atomizing liquid educts in the reformer for the fuel cell.

* * * * *

UNITED STATES PATENT AND TRADEMARK OFFICE
CERTIFICATE OF CORRECTION

PATENT NO. : 6,991,183 B2
APPLICATION NO. : 10/181668
DATED : January 31, 2006
INVENTOR(S) : M. Nau et al.

Page 1 of 5

It is certified that error appears in the above-identified patent and that said Letters Patent is hereby corrected as shown below:

On the title page item (57) In the Abstract line 2, change "to produce hydrogen, having" to --to produce hydrogen. The atomizing nozzle includes--

On the title page item (57) In the Abstract line 3, delete, "(21)" also change, "a gas stream (20)," to --a gas stream 20,--

On the title page item (57) In the Abstract line 4, delete, "(25,27)" & "(19)"

On the title page item (57) In the Abstract line 5, change, "gas/liquid mixture as well as" to --gas/liquid mixture. The atomizing nozzle also includes--

On the title page item (57) In the Abstract line 5, delete, "(24)"

On the title page item (57) In the Abstract line 6, delete, "(25,27)"

On the title page item (57) In the Abstract line 7, change, "chamber (24) having" to --chamber including--

On the title page item (57) In the Abstract line 7, delete, "(16)"

On the title page item (57) In the Abstract line 8, delete, "(18)"

On the title page item (57) In the Abstract line 9, delete, "(20,22)"

Column 1, line 1, insert heading --FIELD OF THE INVENTION--

Column 1, lines 5-6, change "reformer according to the definition of the species in Claim 1." to --reformer.--

Column 1, line 10, delete "alternative"

Column 1, line 15, change "Because" to --Due to the problems of--

Column 1, line 16, change "vehicle remains a problem" to --vehicle,--

Column 1, line 31, change "educts cannot be" to --educts may not be--

UNITED STATES PATENT AND TRADEMARK OFFICE
CERTIFICATE OF CORRECTION

PATENT NO. : 6,991,183 B2
APPLICATION NO. : 10/181668
DATED : January 31, 2006
INVENTOR(S) : M. Nau et al.

It is certified that error appears in the above-identified patent and that said Letters Patent is hereby corrected as shown below:

Column 1, line 36, change "Alternative concepts have been" to --Concepts have been--

Column 1, line 38, change "to carry out" to --to perform--

Column 1, lines 38-39, change "as efficiently as possible," to --efficiently,--

Column 1, line 39, change "educts must be introduced" to --educts are introduced--

Column 1, line 41, change "hydrogen that has" to --hydrogen that includes--

Column 1, line 42, change "is known from" to --is referred to in--

Column 1, line 47, change "The object of the present invention is to provide" to --It is an object of the present invention to provide--

Column 1, line 51, change "being designed for" to --it is configured for--

Column 1, line 53, change "ADVANTAGES OF THE INVENTION" to --SUMMARY OF THE INVENTION--

Column 1, line 56, change "The atomizing nozzle" to --The exemplary atomizing nozzle--

Column 1, lines 57-58, delete, "having the characterizing features of Claim 1 has the advantage"

Column 1, line 67, change "A particularly advantageous feature" to --A--

Column 2, line 1, change "is that a gas flow" to --gas flow--

Column 2, line 4, change "a compact design" to --a compact configuration--

Column 2, line 4, change "Because" to --Due to--

Column 2, line 5, change "nozzle includes" to --nozzle including--

UNITED STATES PATENT AND TRADEMARK OFFICE
CERTIFICATE OF CORRECTION

| | | |
|---|---|---|
| PATENT NO. | : 6,991,183 B2 | Page 3 of 5 |
| APPLICATION NO. | : 10/181668 | |
| DATED | : January 31, 2006 | |
| INVENTOR(S) | : M. Nau et al. | |

It is certified that error appears in the above-identified patent and that said Letters Patent is hereby corrected as shown below:

Column 2, line 9, change "Because the liquid" to --Due to exclusive gas-support of the liquid--

Column 2, lines 9-10, delete "is exclusively gas-supported"

Column 2, lines 13-15, delete, "Advantageous embodiments and refinements of the present invention are made possible by the features described in the subordinate claims."

Column 2, line 18, change "The plunger has" to --The plunger includes--

Column 2, line 25, change "also advantageous" to --also useful--

Column 2, line 28, change "In a particularly advantageous embodiment" to --In an exemplary embodiment--

Column 2, line 32, change "This makes it possible to expose" to --This allows for exposure of--

Column 2, line 34, change "an advantageous embodiment," to --an exemplary embodiment,--

Column 2, line 45, change "DRAWINGS" to --BRIEF DESCRIPTION OF THE DRAWING--

Column 2, lines 47-49, delete "An exemplary embodiment of the present invention is illustrated in the drawing and explained in greater detail in the following description."

Column 2, line 50, change "The Figure shows" to --FIG. 1 shows-- also change, "the atomizing" to --the exemplary atomizing--

Column 2, line 53, change "EXEMPLARY EMBODIMENT" to --DETAILED DESCRIPTION--

UNITED STATES PATENT AND TRADEMARK OFFICE
CERTIFICATE OF CORRECTION

| | |
|---|---|
| PATENT NO. | : 6,991,183 B2 |
| APPLICATION NO. | : 10/181668 |
| DATED | : January 31, 2006 |
| INVENTOR(S) | : M. Nau et al. |

It is certified that error appears in the above-identified patent and that said Letters Patent is hereby corrected as shown below:

Column 2, line 55, change "of atomizing nozzle 10" to --of an exemplary atomizing nozzle 10--

Column 2, line 58, change "which has an" to --which includes an--

Column 2, line 59, change "is designed for" to --is configured for--

Column 3, line 6, change "have a means" to --include an arrangement--

Column 3, line 14, change "It is especially advantageous" to --It is useful--

Column 3, line 23, change "that is designed" to --that is configured--

Column 3, line 25, change "having one or more" to --including one or more--

Column 3, line 31, change "advantageous when" to --useful when--

Column 3, line 43, change "This makes it possible to adjust" to --This allows for adjustment of--

Column 3, lines 51-52, change "is thus preferably designed" to --is thus configured--

Column 3, line 64, change "takes place in" to --occurs in--

Column 4, line 1, change "have different" to --include different--

Column 4, line 3, change "The atomizing nozzle" to --The exemplary atomizing nozzle--

Column 4, lines 11-12, change "It is thus possible to supply air and steam" to --Air and steam are supplied--

Column 4, line 14, change "is preferably supplied" to --is supplied--

UNITED STATES PATENT AND TRADEMARK OFFICE
CERTIFICATE OF CORRECTION

PATENT NO. : 6,991,183 B2
APPLICATION NO. : 10/181668
DATED : January 31, 2006
INVENTOR(S) : M. Nau et al.

It is certified that error appears in the above-identified patent and that said Letters Patent is hereby corrected as shown below:

Column 4, line 16, change "A possible alternative" to --An alternative--

Column 4, line 17, delete "Alternatively,"

Column 4, line 18, change "water may also" to --Water may also--

Column 4, line 24, change "the atomizing nozzle" to --the exemplary atomizing nozzle--

Column 4, line 30, delete "advantageously"

Column 4, line 34, change "The atomizing nozzle" to --The exemplary atomizing nozzle--

Column 4, line 36, change "further embodiments" to --further exemplary embodiments--

Signed and Sealed this

Twenty-third Day of September, 2008

JON W. DUDAS
*Director of the United States Patent and Trademark Office*